(12) United States Patent
Mizutani et al.

(10) Patent No.: US 10,603,996 B2
(45) Date of Patent: Mar. 31, 2020

(54) GLASS RUN

(71) Applicant: TOYODA GOSEI CO., LTD., Kiyosu-shi, Aichi-ken (JP)

(72) Inventors: Hirofumi Mizutani, Kiyosu (JP); Yoshihiko Minagawa, Kiyosu (JP); Taizo Shibata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 74 days.

(21) Appl. No.: 15/905,113

(22) Filed: Feb. 26, 2018

(65) Prior Publication Data

US 2018/0266173 A1   Sep. 20, 2018

(30) Foreign Application Priority Data

Mar. 14, 2017  (JP) ................. 2017-048906

(51) Int. Cl.
| | |
|---|---|
| *B60J 10/763* | (2016.01) |
| *E06B 7/23* | (2006.01) |
| *B60J 10/76* | (2016.01) |
| *B60J 10/277* | (2016.01) |
| *B60J 10/50* | (2016.01) |
| *B60J 10/767* | (2016.01) |
| *B60J 1/20* | (2006.01) |

(52) U.S. Cl.
CPC .......... *B60J 10/763* (2016.02); *B60J 10/277* (2016.02); *B60J 10/50* (2016.02); *B60J 10/76* (2016.02); *B60J 10/767* (2016.02); *E06B 7/2312* (2013.01); *B60J 1/2097* (2013.01); *E06B 7/2314* (2013.01)

(58) Field of Classification Search
CPC ....... E06B 7/2312; B60J 10/50; B60J 10/277; B60J 10/76; B60J 10/763; B60J 10/767
See application file for complete search history.

(56) References Cited

U.S. PATENT DOCUMENTS

| | | | |
|---|---|---|---|
| 7,237,359 B2 * | 7/2007 | Aritake .................... | B60J 10/27 49/440 |
| 7,487,615 B2 * | 2/2009 | Watanabe ................ | B60J 10/74 49/428 |

(Continued)

FOREIGN PATENT DOCUMENTS

| | | | | |
|---|---|---|---|---|
| DE | 102015012302 A1 * | 3/2016 | ............. | B60J 10/30 |
| JP | 2005-153694 A | 6/2005 | | |

(Continued)

*Primary Examiner* — Marcus Menezes
(74) *Attorney, Agent, or Firm* — Posz Law Group, PLC

(57) ABSTRACT

A glass run includes: a main body portion including a base portion, an inner side wall portion and an outer side wall portion; an inner side seal lip; and an outer side seal lip, wherein; the inner side seal lip includes a protruding portion on a rear surface so as to have a protruding surface; and in a case where the door glass inserted into the main body portion is displaced from a reference position to the inside of the vehicle, a state is changeable between a first support state where a tip end portion of a sub-lip and the protruding surface abut against each other and slide, and a second support state where the tip end portion is separated from the protruding surface and a part on a root side than the tip end portion abuts against the protruding portion.

4 Claims, 3 Drawing Sheets

(56) References Cited

U.S. PATENT DOCUMENTS

| | | | |
|---|---|---|---|
| 8,689,489 B2* | 4/2014 | Mine | B60J 10/76 49/441 |
| 8,869,456 B2* | 10/2014 | Matsuura | E06B 7/22 49/489.1 |
| 9,845,000 B2* | 12/2017 | Kojima | B60J 10/76 |
| 2002/0002796 A1* | 1/2002 | Hamada | B60J 10/16 49/441 |
| 2003/0205918 A1* | 11/2003 | Carvalho | B60J 10/235 296/203.03 |
| 2005/0120633 A1 | 6/2005 | Takase et al. | |
| 2005/0198906 A1* | 9/2005 | Fujita | B60J 10/24 49/428 |
| 2006/0248802 A1* | 11/2006 | Tamaoki | B60J 10/16 49/441 |
| 2007/0251152 A1* | 11/2007 | Takase | B60J 10/74 49/441 |
| 2009/0039672 A1* | 2/2009 | Kubo | B29C 45/14 296/146.2 |
| 2009/0071077 A1* | 3/2009 | Takase | B60J 10/277 49/489.1 |
| 2012/0079772 A1* | 4/2012 | Mine | B60J 10/76 49/490.1 |
| 2016/0089962 A1* | 3/2016 | Kuroki | B60J 10/30 49/442 |
| 2017/0136861 A1* | 5/2017 | Kojima | B60J 10/76 |
| 2017/0259659 A1* | 9/2017 | Kojima | B60J 10/23 |

FOREIGN PATENT DOCUMENTS

| | | | | |
|---|---|---|---|---|
| JP | 2007296898 A | * | 11/2007 | B60J 10/27 |
| JP | 2007314123 A | * | 12/2007 | B60J 10/27 |
| JP | 2010-173541 A | | 8/2010 | |
| JP | 2012-025354 A | | 2/2012 | |
| JP | 2017-88031 A | * | 5/2017 | B60J 10/50 |

* cited by examiner

GLASS RUN

CROSS-REFERENCE TO RELATED APPLICATION(S)

This application is based upon and claims the benefit of priority from Japanese Patent Application No. 2017-048906, filed on Mar. 14, 2017, the entire contents of which are incorporated herein by reference.

BACKGROUND

1. Field of the Invention

The present invention relates to a glass run for sealing between a door frame and a door glass.

2. Description of the Related Art

In general, a door frame of a car includes a glass run along an inner circumference thereof. The glass run includes: a main body portion having a substantially U-shaped section which includes a base portion, and an inner side wall portion and an outer side wall portion which extend from the base portion; and an inner side seal lip and an outer side seal lip which respectively extend from a substantially tip end portions of both of the side wall portions toward the inside of the body portion. Furthermore, in the glass run, the main body portion is attached to an attachment portion provided along the inner circumference of the door frame, and is sealed with the both of the seal lips such that a circumferential edge portion of the inner and outer surfaces of the door glass that is raised and lowered is pinched. In addition, the glass run supports the circumferential edge portion of the door glass to play a role of guiding the raising and lowering of the door glass and suppressing the rattling of the door glass.

Meanwhile, in a state where the door glass is positioned slightly lower than a fully closed position, the door glass is likely to be displaced in inward and outward directions of the vehicle. In this state, when the car travels on a bad road, and the door glass vibrates in inward and outward directions of the vehicle, there is concern that the door glass and the seal lip are momentarily separated from each other. In addition, in a case where the door glass and the seal lip are brought into contact with each other from the separated state, there is a concern that abnormal noise (striking sound) caused by the contact occurs. In particular, in a case where the seal lip deteriorates with aging and the elastic force decreases, the seal lip is likely to be separated from the door glass in a case where the door glass vibrates, a concern about occurrence of abnormal noise becomes more substantial.

Meanwhile, there is a technology in which a sub-lip that is capable of supporting by extending from an inner surface (a surface on the inside of the main body portion) of the inner side wall portion and abutting against a rear surface of the vehicle exterior side seal lip pressed against the door glass to be displaced to the inside of the vehicle, is provided, and a sponge piece which is capable of supporting by abutting against a rear surface of the sub-lip sticks to the inner surface of the inner side wall portion. In a case of employing the configuration, a force which brings the inner side seal lip into pressure-contact with the door glass increases, and even in a case where the door glass vibrates, it is possible to prevent a situation in which the seal lip is momentarily separated from the door glass.

However, in this case, since the force which brings the seal lip into pressure-contact with the door glass increases, the resistance that the door glass receives from the seal lip when raising and lowering the door glass increases, and there is a concern that it is difficult to smoothly raise and lower the door glass. In addition, by requiring work for sticking the sponge piece to the inside of the glass run, there is a concern that manufacturing workability deteriorates.

In addition, for example, in a longitudinal side portion which vertically extends in the glass run, a hollow head portion which protrudes from the inner surface of the inner side wall portion is provided along a longitudinal direction of the longitudinal side portion, and by the bead portion, there is a technology in which the outer side seal lip displaced to the inside of the vehicle can be supported, and an upper end portion and a lower end portion of the bead portion are closed, and an air vent hole is provided at an intermediate position in the vertical direction of the bead portion (for example, refer to JP-A-2012-25354).

By employing the technology of JP-A-2012-25354, in a state where the door glass is positioned above the air vent hole and the air vent hole is closed, the force which brings the seal lip into pressure-contact with the door glass increases, and in a state where the door glass is positioned below the air vent hole and the air vent hole is open, it is possible to reduce the force which brings the seal lip into pressure-contact with the door glass. Accordingly, in a state where the air vent hole is not closed, it is possible to smoothly raise and lower the door glass, and in a state where the air vent hole is closed, a pressure-contact force of the seal lip to the door glass increases, and it is possible to maintain a contact state between the seal lip and the door glass even when the door glass vibrates.

However, in the technology, it is necessary to perform work for closing the upper and lower end portions of the bead portion and forming the air vent hole in the bead portion, and accordingly, there is a concern that the manufacturing workability deteriorates. In addition, in a case where the door glass is positioned below the air vent hole, and in a case where the door glass vibrates, there is a concern that the seal lip is easily separated from the door glass.

SUMMARY

The invention has been made in consideration of the above-described problem, and an object thereof is to provide a glass run which can appropriately ensure soundproof performance and raising and lowering performance of a door glass while improving manufacturing workability.

Hereinafter, each aspect appropriate for solving the above-mentioned object and the like will be described separately. In addition, unique functional effects are added to the corresponding means as necessary.

According to a first aspect of the present invention, there is provided a glass run including: a main body portion, having a substantially U-shaped section, including: a base portion; and an inner side wall portion and an outer side wall portion which extend from the base portion, the main body portion being attached to an attachment portion provided along an inner circumference of a door frame of a vehicle; an inner side seal lip which extends toward the outside of vehicle from the inner side wall portion; and an outer side seal lip which extends toward the inside of the vehicle from the outer side wall portion, wherein; regarding a longitudinal side portion which corresponds to at least one of front and rear longitudinal edge portions of a door glass, the inner side seal lip extends from a tip end portion or the vicinity of the inner side wall portion toward the outside of the vehicle and an outer circumferential side of the door frame, includes a protruding portion on a rear surface opposite to a front surface that abuts against the door glass of the inner side seal lip so as to have a protruding surface at a position that protrudes more than a general surface of the rear surface of the inner side seal lip; a sub-lip is provided which extends toward the outside of the vehicle from a part on a side of the base portion than a root portion of the inner side seal lip in the inner side wall portion; and in a case where the door glass inserted into the main body portion is displaced from a reference position to the inside of the vehicle, a state is changeable between a first support state where a tip end portion of the sub-lip and the protruding surface abut against each other and slide, and a second support state where the tip end portion of the sub-lip is separated from the protruding surface and a part on a root side than the tip end portion in the sub-lip abuts against the protruding portion.

According to the first aspect, the protruding portion is provided on the rear side of the inner side seal lip, the inner side seal lip at the part is made thick, and the sub-lip which extends from the inner side wall portion so as to be capable of abutting against the protruding surface of the protruding portion, is provided. Accordingly, a force which brings the inner side seal lip into pressure-contact with the door glass increases, and even in a case where the door glass vibrates, it is possible to prevent a situation in which the outer side seal lip is momentarily separated from the door glass. Therefore, for example, in a case where the outer side seal lip and the door glass are in contact with each other from a state of being separated from each other, it is possible to prevent a situation in which abnormal noise (striking sound) caused by the contact occurs. Furthermore, in order to increase the pressure-contact force (reaction force) of the inner side seal lip to the door glass, since there is no need for another work, such as sticking a separate member, such as a sponge piece, to the inside of the glass run (only extrusion molding may be performed with respect to the longitudinal side portion), it is possible to dramatically improve the manufacturing workability.

In addition, in a case where the door glass inserted into the main body portion is displaced from a reference position to the inside of the vehicle, a state is changeable between a first support state where a tip end portion of the sub-lip and the protruding surface abut against each other and slide, and a second support state where the tip end portion of the sub-lip is disengaged from the protruding surface and a part on a root side than the tip end portion in the sub-lip abuts against the protruding portion. In other words, basically, the door glass and the inner side seal lip strongly come into pressure-contact with each other as the door glass is largely displaced from the reference position to the inside of the vehicle, and the reaction force of the inner side seal lip increases. However, when the state changes from the first support state to the second support state, since the support of the tip end portion of the sub-lip on the protruding surface is released, the increase in reaction force of the inner side seal lip is temporarily suppressed. Therefore, when the reaction force of the inner side seal lip becomes extremely high, and raises and lowers the door glass, it is possible to avoid a situation in which the resistance that the door glass receives from the seal lip increases, and it is difficult to smoothly raise and lower the door glass. As a result, it is necessary to improve the soundproof performance by increasing the reaction force of the inner side seal lip, and to prevent the reaction force of the inner side seal lip from becoming excessively high, thereby it is possible to appropriately satisfy the requirement of contradiction that the raising and lowering performance of the door glass is ensured.

Furthermore, even in the second support state, the abutting state between the inner side seal lip and the sub-lip is not released, and the reaction force of the inner side seal lip is sufficiently large for preventing a situation in which the outer side seal lip is momentarily separated from the door glass even in a case where the door glass vibrates.

According to a second aspect of the invention, the inner side seal lip may have a linking surface that obliquely links the protruding surface and the general surface to each other.

According to the second aspect, it is possible to increase the strength of the boundary portion between the protruding surface of the protruding portion and the linking surface, and it is possible to suppress damage, scraping, crushing, and the like of the boundary portion and to improve the durability of the protruding portion.

According to a third aspect of the invention, the sub-lip may extend from the inner side wall portion toward the outside of the vehicle and the inner circumferential side of the door frame, and in the extending direction of the inner side seal lip from the inner side wall portion, the protruding surface may extend at substantially the same angle as an angle of the general surface, or may be inclined with respect to the general surface toward a tip end portion of the inner side seal lip so that a protrusion length of the protruding portion gradually decreases.

According to the third aspect, in a case where the door glass is displaced from the reference position to the inside of the vehicle, until the reaction force of the inner side seal lip becomes a specific size or greater, the tip end portion of the sub-lip and the protruding surface of the inner side seal lip abut against each other, and it is possible to reliably maintain the first support state where the reaction force of the inner side seal lip effectively increases. Therefore, the functional effects of increasing the reaction force of the inner side seal lip and preventing abnormal noise are more reliably exhibited.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
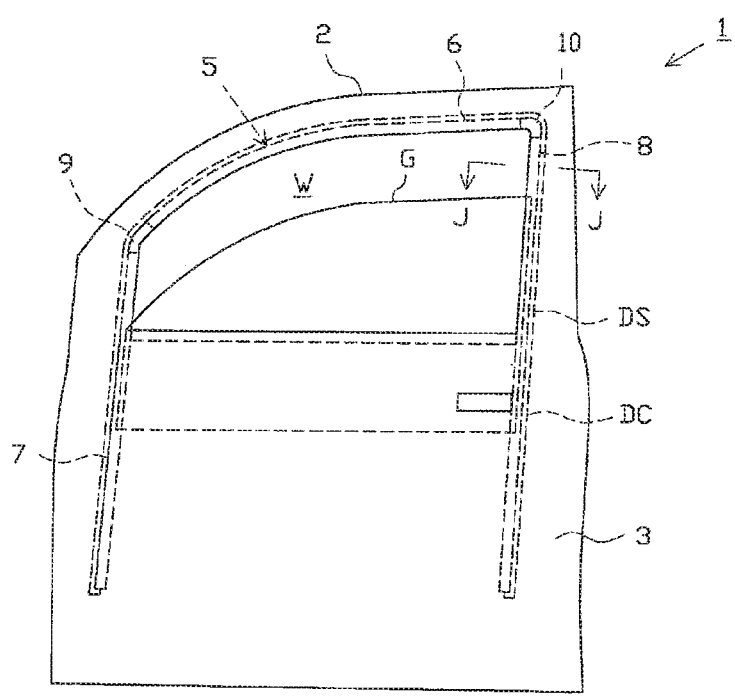
FIG. 1 is a front schematic view illustrating a schematic configuration of a door.

Hereinafter, an embodiment will be described with reference to the drawings. As illustrated in FIG. 1, a front door (hereinafter, simply referred to as "door 1") includes: a door glass G which is provided to be raisable and lowerable, and opens and closes a window W formed on an inner circumferential side of the door frame 2; and a glass run 5 which is provided along an inner circumference of the door frame 2, guides the raising and lowering of the door glass G, and seals between a circumferential edge portion of the door glass G and the door frame 2.

In addition, the glass run 5 includes an extrusion molded portion 6 that corresponds to the upper edge portion of the door glass G, extrusion molded portions 7 and 8 that serve as longitudinal side portions that correspond to the front and rear longitudinal edge portions of the door glass G, and molded portions 9 and 10 which connect terminal portions of extrusion molded portions 6-7 and 6-8 to each other. Each of the extrusion molded portions 6 to 8 is formed in a substantially straight shape by an extrusion molding machine (not illustrated). The molded portions 9 and 10 are molded to be connected by a mold device (not illustrated) so that the two extrusion molded portions 6-7 and 6-8 are connected to each other in a state of making a predetermined angle. In addition, a sash portion DS formed along the inner circumference of the door frame 2, and a glass run 5 is attached to a channel portion DC provided in the door panel 3 so as to extend the front and rear longitudinal side portions of the sash portion DS downward. In the embodiment, the sash portion DS and the channel portion DC correspond to the attachment portion.

Figure 2:
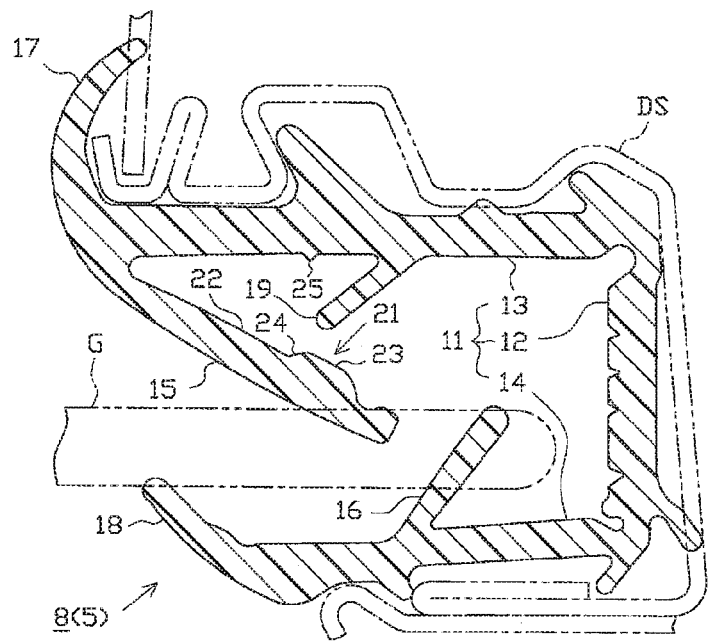
FIG. 2 is a sectional view of a glass run taken along a J-J line in FIG. 1.

As illustrated in FIG. 2, the extrusion molded portion 8 includes: a main body portion 11 having a substantially U-shaped section which includes a base portion 12, and an inner side wall portion 13 and an outer side wall portion 14 which extend from the base portion 12, and is fitted into the sash portion DS (or the channel portion DC) having a substantially U-shaped section; an inner side seal lip 15 which extends from the tip end portion of the inner side seal lip 13 toward the outside of the vehicle, that is, the outer circumferential side (inside of the main body portion 11) of the door frame 2; and an outer side seal lip 16 which extends from an intermediate position of the outer side wall portion 14 toward the inside of the vehicle, that is, the outer circumferential side of the door frame 2. Furthermore, in FIG. 2, the upper side of the paper surface is the inside of the vehicle, and the lower side of the paper surface is the outside of the vehicle.

Figure 3:
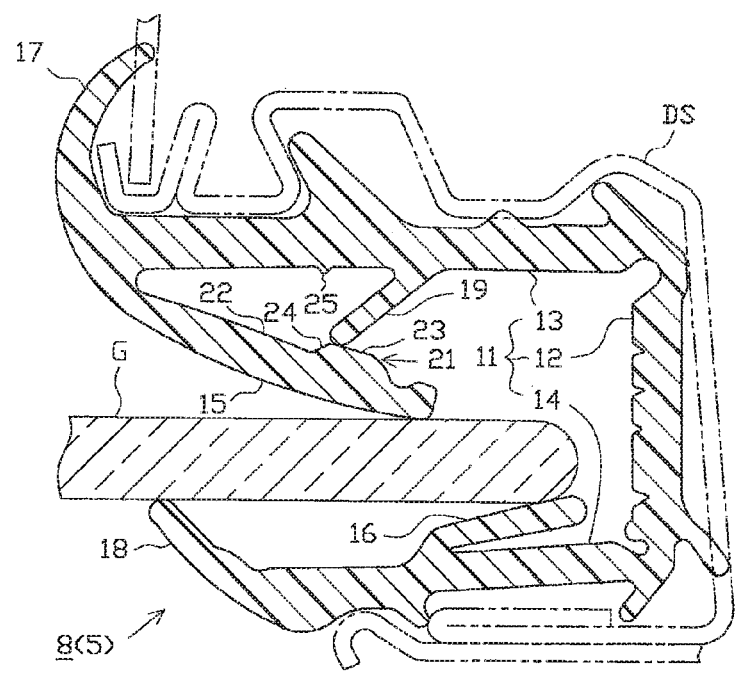
FIG. 3 is a sectional view of a glass run illustrating a state where a door glass is inserted into a main body portion.

In a state where the window W is closed by the door glass G, as illustrated in FIG. 3, the inner side seal lip 15 is brought into pressure-contact with the inside surface of the vehicle of the door glass G, and the outer side seal lip 16 is brought into pressure-contact with the outside surface of the vehicle of the door glass G. Accordingly, the inside of the door glass G and the outside of the vehicle are sealed, respectively. In addition, the extrusion molded portion 8 is provided with a design lip 17 which extends from the tip end portion of the inner side wall portion 13 toward the inside of the vehicle, and a cover lip 18 which extends from the tip end portion of the outer side wall portion 14 to the inside of the vehicle and the inner circumferential side of the door frame 2.

In addition, the extrusion molded portions 6 and 7 and the molded portions 9 and 10 basically have the same sectional shape as that of the extrusion molded portion 8, and are provided with the main body portion 11 and the seal lips 15 and 16 (not illustrated). Furthermore, the glass run 5 in the embodiment is configured of TPO (olefinic thermoplastic elastomer).

Furthermore, as illustrated in FIG. 2 and the like, in the embodiment, the extrusion molded portion 8 that corresponds to the rear longitudinal edge portion of the door glass G is provided with a sub-lip 19 that extends from the intermediate position of the inner side wall portion 13 from the outside of the vehicle, that is, the inner circumferential side of the door frame 2. In addition, the inner side seal lip 15 is provided with a protruding portion 21 on the rear surface opposite to the front surface which abuts against the door glass G, and accordingly, a protruding surface 23 is provided at a position protruding from a general surface 22 of the rear surface of the inner side seal lip 15. Furthermore, the inner side seal lip 15 has a linking surface 24 that obliquely links the protruding surface 23 and the general surface 22 to each other. With this configuration, parts that correspond to a formation range of the protruding surface 3 and the linking surface 24 are thicker than the parts that correspond to a formation range of the general surface 22, in the inner side seal lip 15. In addition, in the extending direction of the inner side seal lip 15 from the inner side wall portion 13, the protruding surface 23 extends at substantially the same angle as that of the general surface 22.

As illustrated in FIG. 3, in a case where the door glass G is inserted into the main body 11, the inner side seal lip 15 is pressed against the door glass G and is displaced to the inside of the vehicle, and the tip end portion of the sub-lip 19 and the protruding surface 23 of the inner side seal lip 15 abut against each other (or close to each other). In the embodiment, the position of the door glass G in FIG. 3 is a reference position where the door glass G is positioned in a case where the door glass G stands still without vibrating in inward and outward directions of the vehicle. Furthermore, since the door glass G is brought close to the outside of the vehicle due to the shape or the like of the base portion 12 of the extrusion molded portion 6 that corresponds to the upper edge portion of the door glass G at the time of fully closing the window portion W, FIG. 3 illustrates a state other than a state where the window W is fully closed. In addition, in the embodiment, even in a state where the door glass G is slightly displaced to the outside of the vehicle than the reference position (naturally, including the fully closed state of the window portion W), the outer side seal lip 16 abuts against the door glass G.

From the state illustrated in FIG. 3, in a case where the door glass G is further displaced to the inside of the vehicle, the inner side seal lip 15 and the sub-lip 19 are tilted and displaced to the inside of the vehicle following the door glass G, and while maintaining a state of abutting against the protruding surface 23, the tip end portion of the sub-lip 19 is relatively slidably displaced (slides) to a root portion side of the inner side seal lip 15. In the embodiment, a state which includes the state illustrated in FIG. 3 and where the tip end portion of the sub-lip 19 and the protruding surface 23 abut against each other and slide, corresponds to a first support state.

Figure 4:
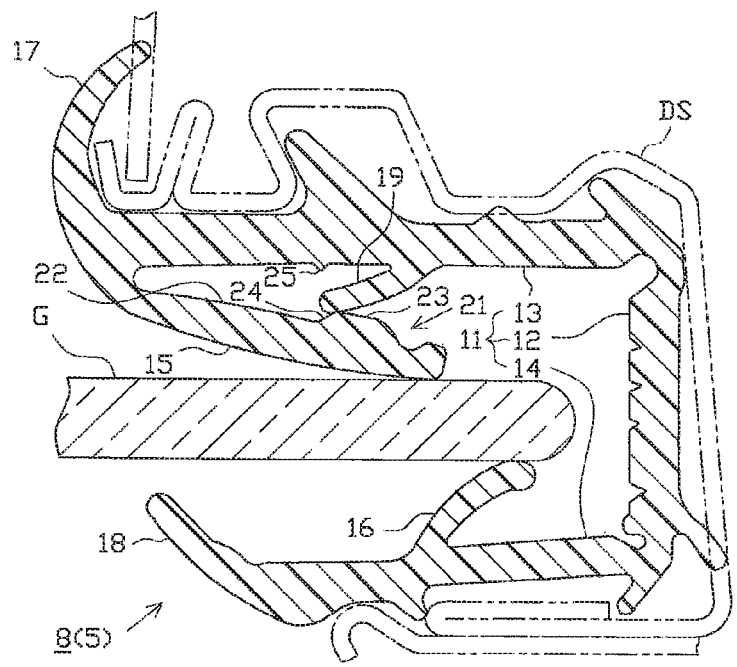
FIG. 4 is a sectional view of the glass run for describing a relationship between displacement of the door glass and deformation of an inner side seal lip and a sub-lip.

From the state where tip end portion of the sub-lip 19 slides to the end portion on the root portion side of the inner side seal lip 15 in the protruding surface 23, in a case where the door glass G is further displaced to the inside of the vehicle, as illustrated in FIG. 4, the inner side seal lip 15 and the sub-lip 19 are tilted and displaced to the inside of the vehicle following the door glass G, and the tip end portion of the sub-lip 19 is disengaged to the root portion side of the inner side seal lip 15 from the protruding surface 23. In the state illustrated in FIG. 4, the vicinity part (the part on the root portion side than the tip end portion) of the tip end portion of the sub-lip 19 abuts against the boundary portion between the protruding surface 23 and the linking surface 24.

Figure 5:
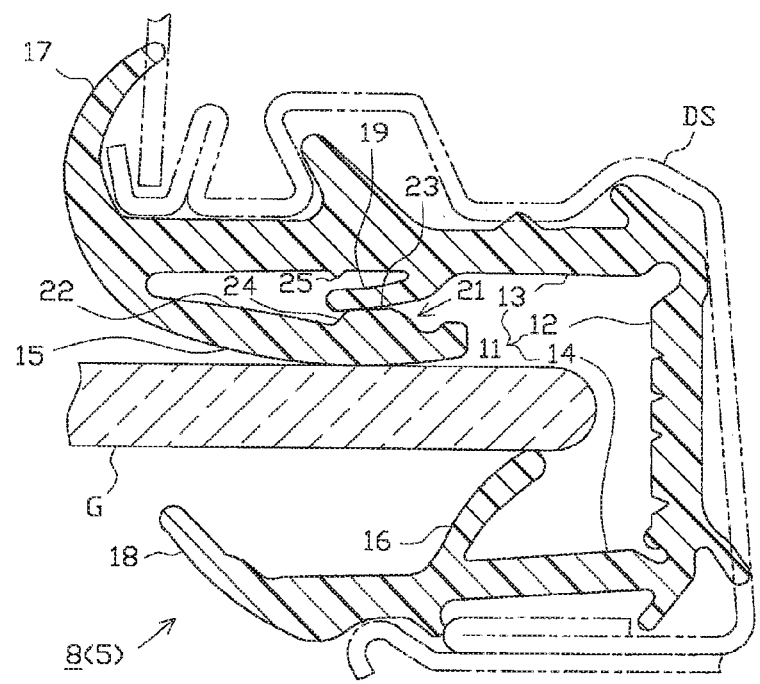
FIG. 5 is a sectional view of the glass run for describing a relationship between displacement of the door glass and deformation of the inner side seal lip and the sub-lip.

From the state illustrated in FIG. 4, in a case where the door glass G is further displaced to the inside of the vehicle, as illustrated in FIG. 5, the inner side seal lip 15 and the sub-lip 19 are tilted and displaced to the inside of the vehicle following the door glass G, and regarding the sub-lip 19, the part on the root portion side than the tip end portion of the sub-lip 19 abuts against the protruding surface 23. In the embodiment, the state which includes the state illustrated in FIGS. 4 and 5, and where the tip end portion of the sub-lip 19 is disengaged from the protruding surface 23 and the part on the root side than the tip end portion in the sub-lip 19 abuts against the protruding portion 21, corresponds to a second support state. In addition, even in the first support state and the second support state, the outer side seal lip 16 is configured to abut against the door glass G.

Furthermore, in the inner side wall portion 13, an adhesion prevention protruding portion 25 is provided at a position which can abut against the part on the tip end portion side on the rear surface of the sub-lip 19, and from the state illustrated in FIG. 5, in a case where the door glass G is further displaced to the inside of the vehicle, the inner side seal lip 15 and the sub-lip 19 are tilted and displaced to the inside of the vehicle following the door glass G, and the sub-lip 19 abuts against the inner side wall portion 13, the adhesion prevention protruding portion 25 abuts against the sub-lip 19 immediately therebefore.

As described in detail above, according to the embodiment, the protruding portion 21 is provided on the rear side of the inner side seal lip 15, the inner side seal lip 15 at the part is made thick, and the sub-lip 19 which extends from the inner side wall portion 13 so as to be capable of abutting against the protruding surface 23 of the protruding portion 21, is provided. Accordingly, a force which brings the inner side seal lip 15 into pressure-contact with the door glass G increases, and even in a case where the door glass G vibrates, it is possible to prevent a situation in which the outer side seal lip 16 is momentarily separated from the door glass G. Therefore, for example, in a case where the outer side seal lip 16 and the door glass G are in contact with each other from a state of being separated from each other, it is possible to prevent a situation in which abnormal noise (striking sound) caused by the contact occurs. Furthermore, in order to increase the pressure-contact force (reaction force) of the inner side seal lip 15 to the door glass G, since there is no need for another work, such as sticking a separate member, such as a sponge piece, to the inside of the glass run 5 (it is possible to integrally mold the sub-lip 19, the protruding portion 21 or the like by the extrusion molding), it is possible to dramatically improve the manufacturing workability.

In addition, in a case where the door glass G inserted into the main body portion 11 is displaced from the reference position to the inside of the vehicle, a state is changeable between the first support state where a tip end portion of the sub-lip 19 and the protruding surface 23 abut against each other and slide, and the second support state where the tip end portion of the sub-lip 19 is separated from the protruding surface 23 and the part on the root side than the tip end portion in the sub-lip 19 abuts against the protruding portion 21. In other words, basically, the door glass G and the inner side seal lip 15 strongly come into pressure-contact with each other as the door glass G is largely displaced from the reference position to the inside of the vehicle, and the reaction force of the inner side seal lip 15 increases. However, when the state changes from the one support state to the second support state, since the support of the tip end portion of the sub-lip 19 on the protruding surface 23 is released, the increase in reaction force of the inner seal lip 15 is temporarily suppressed. Therefore, when the reaction force of the inner side seal lip 15 becomes extremely high, and raises and lowers the door glass G, it is possible to avoid a situation in which the resistance that the door glass G receives from the seal lips 15 and 16 increases, and it is difficult to smoothly raise and lower the door glass G. As a result, it is necessary to improve the soundproof performance by increasing the reaction force of the inner side seal lip 15, and to prevent the reaction force of the inner side seal lip 15 from becoming excessively high, thereby it is possible to appropriately satisfy the requirement of contradiction that the raising and lowering performance of the door glass G is ensured.

Furthermore, even in the second support state, the abutting state between the inner side seal lip 15 and the sub-lip 19 is not released, and the reaction force of the inner side seal lip 15 is sufficiently large for preventing a situation in which the outer side seal lip 16 is momentarily separated from the door glass G even in a case where the door glass G vibrates.

In addition, the inner side seal lip 15 has a linking surface 24 that obliquely links the protruding surface 23 of the protruding portion 21 and the general surface 22 to each other. Therefore, it is possible to increase the strength of the boundary portion between the protruding surface 23 of the protruding portion 21 and the linking surface 24, and it is possible to suppress damage, scraping, crushing, and the like of the boundary portion and to improve the durability of the protruding portion 21.

Furthermore, in the extending direction of the inner side seal lip 15 from the inner side wall portion 13, the protruding surface 23 extends at substantially the same angle as that of the general surface 22. Therefore, in a case where the door glass G is displaced from the reference position to the inside of the vehicle, until the reaction force of the inner side seal lip 15 becomes a specific size or greater, the tip end portion of the sub-lip 19 and the protruding surface 23 of the inner side seal lip 15 abut against each other, it is possible to reliably maintain the first support state where the reaction force of the inner side seal lip 15 effectively increases. Therefore, the functional effects of increasing the reaction force of the inner side seal lip 15 and preventing abnormal noise are more reliably exhibited.

Furthermore, the invention is not limited to the description of the embodiment above, and may be implemented as follows, for example. It is needless to say that other application examples and modification examples which are not exemplified below are also possible.

(a) in the above-described embodiment, the embodiment is specified as the extrusion molded portion 8 that corresponds to the rear longitudinal edge portion of the door glass G in the glass run 5, but instead of or in addition to the structure, it is also possible to employ the invention the extrusion molded portion 7 that corresponds to the front longitudinal edge portion of the door glass G. In addition, in the above-described embodiment, the glass run 5 of the front door is described in detail, but the invention may be employed to a glass run of a rear door or the like. Furthermore, the configuration of the sash portion DS is not particularly limited, and may be configured by bending the end edge portion of the door frame 2 (outer panel) to have a substantially U-shaped section. In addition, for example, a configuration of a type (channelless structure) in which end edges of the outer panel and the inner panel that configure the door frame 2 are bent toward the inner circumferential side of the window portion W to oppose each other, and the channel member having a substantially U-shaped section is provided therebetween, or a type in which a molding member having a substantially U-shaped section is attached to the end portion of the outer panel (or the inner panel), may be adopted.

(b) In the above-described embodiment, a configuration in which the protruding surface 23 extends substantially in parallel with the general surface 22, but for example, the protruding length of the protrusion 21 gradually decreases toward the tip end side of the inner side seal lip 15, the protruding surface 23 is inclined with respect to the general surface 22, may be employed.

(c) In the above-described embodiment, the glass run 5 is configured of TPO, but may be configured of another material, such as ethylene-propylene-diene copolymer rubber (EPDM) or the like.

What is claimed is:

1. A glass run comprising:
   a main body portion, having a substantially U-shaped section, including: a base portion; and an inner side wall portion and an outer side wall portion, which each extend from the base portion, the main body portion being attached to an attachment portion provided along an inner circumference of a door frame of a vehicle;
   an inner side seal lip that extends toward an outside of the vehicle from the inner side wall portion of the main body portion;
   an outer side seal lip that extends toward an inside of the vehicle from the outer side wall portion of the main body portion;
   a longitudinal side portion that corresponds to at least one of front and rear longitudinal edge portions of a door glass, wherein
   the inner side seal lip on the longitudinal side portion extends from the inner side wall portion toward the outside of the vehicle and an outer circumferential side of the door frame, includes a protruding portion on a rear surface of the inner side seal lip opposite to a front surface that abuts against the door glass so as to have a protruding surface at a position that outwardly protrudes farther than a first surface of the rear surface of the inner side seal lip;
   a sub-lip is provided that extends toward the outside of the vehicle from a surface on the inner side wall portion of the main body portion located between the base portion and a root of the inner side seal lip;
   in a case where the door glass inserted into the main body portion is displaced from a reference position to the inside of the vehicle, a state is changeable between a first support state where a tip end portion of the sub-lip and the protruding surface abut against each other and slide, and a second support state where the tip end portion of the sub-lip is separated from the protruding surface and a part of the sub-lip closer to a root of the sub-lip than the tip end portion of the sub-lip abuts against the protruding portion;
   the position of the door glass in the second support state is closer to the inside of the vehicle than the position of the door glass in the first support state;
   the position of the tip end portion of the sub-lip in the second support state is closer to the inner side wall portion than in the first support state such that the tip end portion of the sub-lip is separated from the protruding surface; and
   the protruding portion, the protruding surface, inner side seal lip, and the tip end portion of the sub-lip are formed of a same material.

2. The glass run according to claim 1, wherein
   the inner side seal lip has a linking surface that obliquely links the protruding surface and the first surface to each other.

3. The glass run according to claim 1, wherein:
   the sub-lip extends from the inner side wall portion toward the outside of the vehicle and an inner circumferential side of the door frame; and
   in an extending direction of the inner side seal lip from the inner side wall portion, the protruding surface extends at substantially the same angle as an angle of the first surface, or is inclined with respect to the first surface toward a tip end portion of the inner side seal lip.

4. The glass run according to claim 2, wherein:
   the sub-lip extends from the inner side wall portion toward the outside of the vehicle and an inner circumferential side of the door frame; and
   in an extending direction of the inner side seal lip from the inner side wall portion, the protruding surface extends at substantially the same angle as an angle of the first surface, or is inclined with respect to the first surface toward a tip end portion of the inner side seal lip.

* * * * *